United States Patent [19]
Kubota et al.

[11] Patent Number: 5,883,242
[45] Date of Patent: Mar. 16, 1999

[54] STARCH FOR PAPER MAKING

[75] Inventors: Satoshi Kubota, Kashihara; Akitomo Terada, Shiki-gun; Yoshiteru Yamamoto, Kashihara, all of Japan

[73] Assignee: Sanwa Cornstarch Co., Ltd., Nara, Japan

[21] Appl. No.: 845,408

[22] Filed: Apr. 25, 1997

[30] Foreign Application Priority Data

Apr. 25, 1996 [JP] Japan ................................. 8-105011

[51] Int. Cl.⁶ ............................ C08B 31/10; D21F 11/00
[52] U.S. Cl. ......................... 536/45; 162/157.1; 536/48; 536/50; 536/102; 536/111
[58] Field of Search ............... 536/30, 56, 17.2, 536/17.9, 29.1, 102, 111, 45, 48, 50; 162/157.1

[56] References Cited

U.S. PATENT DOCUMENTS

| | | | |
|---|---|---|---|
| 3,674,725 | 7/1972 | Aitken et al. | 260/9 |
| 4,066,673 | 1/1978 | Doughty et al. | |
| 4,146,515 | 3/1979 | Buikema et al. | 260/9 |
| 4,464,528 | 8/1984 | Tasset | 536/50 |
| 5,652,360 | 7/1997 | Tanaka et al. | 536/45 |

FOREIGN PATENT DOCUMENTS

| | | |
|---|---|---|
| 404812 | 9/1970 | Australia . |
| 542236 | 5/1993 | European Pat. Off. . |
| 57-117697 | 7/1982 | Japan . |
| 59-199900 | 11/1984 | Japan . |
| 06057693 | 3/1994 | Japan . |
| 06184992 | 7/1994 | Japan . |

OTHER PUBLICATIONS

Stoutjesdijk et al., *Wochenbl. Papierfabr.*, vol. 103 (23/24) pp. 897–901. Abstract Only, 1975.

Patent Abstracts of Japan, vol. 096, No. 007, Jul. 31, 1996 & JP 08 073502 A (Daiwa Kagaku Kogyo KK), Mar. 19, 1996, abstract.

Patent Abstracts of Japan, vol. 004, No. 186 (C–036), Dec. 20, 1980, & JP 55 125101 A (Nichiden Kagaku KK), Sep. 26, 1980, abstract.

*Primary Examiner*—Howard C. Lee
*Attorney, Agent, or Firm*—Wenderoth, Lind & Ponack, L.L.P.

[57] ABSTRACT

The present invention provides a cationic starch prepared by roasting starch under the presence of a cationic polymer, a method for preparing the cationic starch, and a method for making paper board with the cationic starch. The method for making paper board of the present invention provides high retention of starch in paper board, enhances paper board strength in a high level and reduces a load of treating waste water from a paper machine, in comparison with the starch which has conventionally been employed for paper making.

6 Claims, No Drawings

STARCH FOR PAPER MAKING

FIELD OF THE INVENTION

The present invention relates to a cationic starch which is prepared by roasting starch under the presence of a cationic polymer. In particular, when the cationic starch of the present invention is employed as a slurry of ungelatinized starch granules in the process of making paper board, the cationic starch granules are highly retained in the paper layer, enhances paper strength in a high level and reduces a load of treating waste water from a paper machine, in comparison with the starch which has conventionally been employed for paper making.

BACKGROUND OF THE INVENTION

Recently, polyacrylamide (PAM) has been added in a large amount to pulp slurry in the manufacturing process of paper board, in order to prevent the reduction of paper board strength caused by the degradation of pulp quality attributed to the increase of usage amount of recycled waste paper. The addition of PAM increases the strength of paper board, but reduces flexibility and water absorption of the paper board. Particularly, in the case of corrugated board raw paper, the addition of PAM results in the reduction of the adhesion between a corrugating medium and a liner in the process of adhering corrugated board, and results in the increase of a load of power required for corrugation. For the purpose of making paper board that has flexibility and proper water absorption, excellent tensile strength, good compressive strength and good bursting strength, and good adhesion property, starch has become important as a chemical instead of PAM.

However, the solution of the problem has become more difficult by the increase of paper machine speed and the development of a paper machine which decreases retention of starch by dehydrating from both sides of a layer of paper, such as twin-wire paper machine. As the reflection of such tendency, it has been required to improve PAM used conventionally or to develop novel starch effectively increasing paper strength.

When starch is used as a modifier in paper-making process, generally there are two methods. The first is a method comprising the steps of adding starch for wet-end, which is referred to as "wet-end addition", flowing it on a wire of the paper machine, and paper-making. The second is a method comprising the step of spraying a slurry of starch granules on a wet web on the wire of the paper machine. In the first method, the addition of starch can be conducted either by adding the ungelatinized starch in the state of slurry for the wet-end, or by adding the gelatinized starch in the state of solution for the wet-end.

In the method in which a solution of gelatinized starch is added as a wet-end additive, the paper layer is not expected to achieve high retention of starch, which has neutral or negative charge, such as the unmodified starch or a phosphorylated starch, since the starch has no attraction to negative charge of the pulp. On the other hand, cationic starch conventionally used has attraction to the pulp to provide good retention of starch in the paper layer when it is used in an amount of less than 1% based on a pulp to make paper board. However, when the conventional cationic starch is added in an amount of more than several percent, the retention of starch in the paper layer adversely reduces and the starch enters in white water to increase a load of treating waste water from a paper machine. Also, in the method in which ungelatinized starch granules are added as a wet-end additive to pulp slurry in the state of slurry, the retention of starch is lower than 50% when conventional starch is used. Further, in the method in which starch granules are sprayed in the state of slurry on the wet web on the wire to retain them on the surface of and in the paper layer, the retention of starch is not decreased when using the Fourdrinier paper machine, a tanmo paper machine and a multicylinder paper machine, etc., dehydrating the paper layer from one side, but the starch granules escape from the paper layer and are not retained therein when using a twin-wire paper machine dehydrating the paper layer from both sides of the layer. Thus, it is required to develop starch having high retention in a paper layer.

Starch is generally composed of granules having a granule size of several micrometers to about one hundred micrometers, and is not dissolved in cold water, and the starch granules added in water are present in the state of slurry suspended in the water. However, when the slurry is heated, the starch granules absorb water to start swelling. When they are continuously heated, the starch granules are lapsed at about 90° C., and are dispersed in the form of molecules to form so-called gelatinized solution. Tackiness or adhesion peculiar to the starch is provided by the starch dispersed in the state of molecules.

In the process of making paper and paper board, the pulp suspended in water is dehydrated on the wire of the paper machine to form a wet web in which pulp is loosely bonded. Then, in the process of pressing and drying, the bond between pulps is more strongly dependent on the degree of removing water to form paper layer. However, paper strength is generally increased by adding a solution of gelatinized starch, in which starch granules are dispersed in the state of molecules, or adding PAM to increase the bonding strength between pulps.

When a gelatinized solution of raw starch which is electrically neutral or phosphorylated starch which is negatively charged is added as a wet-end additive, the bonding strength between starch molecules and pulp is relatively low, and most of the starch dispersed in the gelatinizated solution is removed from the paper layer together with the white water dehydrated on the wire of a paper machine. As the result, the retention of starch in the paper layer is too low to contribute enhancement of paper board strength. Further, the starch contained in the white water makes waste water treatment difficult.

When the gelatinized solution of the cationic starch is added as a wet-end additive at a low content per a pulp, it provides high bonding strength by the electrostatic attraction, and drastically increases the retention of starch. However, when the charge amount of the cationic starch added is more than the negative charge amount of the pulp, the retention of starch is adversely lowered. Accordingly, high retention of starch is accomplished when the cationic starch is added in an amount of less than about 1% per pulp as seen in paper, but retention is lowered when the starch is added in an amount of more than about 1%, for example several % as seen in improvement of paper board strength.

Another method is also known to the art, in which an aqueous suspension of starch granules is added as a wet-end additive in pulp slurry, and mechanically trapped in a wet web during dehydrating on a wire of a paper machine, whereby the starch granules are gelatinized at a heating and drying process to create adhesion power. In this method, when raw starch or negative charged starch is employed, the retention of starch increases more than the internal addition of the solution of gelatinized starch, but it is still less than 50%. Also, when a cationic starch is employed, the advantage of positive charge does not appear separated from the addition of the solution of gelatinized starch and the retention is kept less than 50%.

In a method in which paper board strength is improved by spraying a slurry of the starch granules on a surface of a wet web on a wire of a paper machine to retain the starch in the paper layer, good retention of starch is provided when using the Fourdrinear paper machine, a tanmo paper machine and a multicylinder paper machine dehydrating paper layer from one side of the paper layer. However, it is difficult to provide a uniform distribution of the starch granules in the paper layer as a density of the granules is increased near the surface of the layer of paper. The uniform distribution in the paper layer can be accomplished when a location of spraying is moved upstream of the wire where the paper layer is insufficiently formed, but the retention of starch is lowered by increasing leakage of the starch in the white water. Further, the retention of starch significantly reduces when the twin-wire paper machine dehydrating the wet web through the wires on both sides of the wet web is employed.

Although paper strength is increased by adding PAM, its amount is limited and an increase of the amount is difficult, because it causes lowering drainage property, and fouling a felt in the process of paper-making and, besides decreasing adhesion from decreasing water absorption of the paper in the process of making corrugated board and increasing a load of power required for corrugating it from decreasing the flexibility of paper board. Accordingly, it is strongly desired to develop a starch having an improved retention in the process of paper-making, but there has been no starch which has sufficient properties. It is required to develop starch which has a good retention, excellent reinforcing properties of paper board and easy treatment in an industrial production.

SUMMARY OF THE INVENTION

The present invention provides a method for preparing a cationic starch, which comprises roasting starch at a temperature of from 60° C. to 200° C. or 10 minutes to 5 hours in dry process under the presence of 0.1 to 7 parts by weight of a cationic polymer based on 100 parts by weight of the starch.

There are cationic starches which have been used as paper additive to improve the paper strength. They include a tertiary amine type, such as a starch of which hydroxyl groups present in glucose units are reacted with 2-dimethylaminoethyl chloride; and a quaternary ammonium salt, such as a starch of which hydroxyl groups present in glucose units are reacted with 2,3-epoxypropyltrimethylammonium chloride. However, the conventional cationic starch does not provide the effect of the presence of cationic groups, when a gelatinized solution or ungelatinized granule slurry of the conventional cationic starch are added as a wet-end additive or sprayed on a wet web in the content of several % of the total pulp.

The present inventors have found that paper board strength is drastically improved by adding as a wet-end additive or spraying on wires in the state of slurry of the granular starch obtained by roasting under the presence of a cationic polymer to sufficiently retain the starch in the paper layer.

It is well known that a low molecular cationizing agent, such as 2-dimethylaminoethyl chloride and 2,3-epoxypropyltrimethylammonium chloride, is reacted with starch to form cationic starch. In other words, it can be easily supposed that a compound having alkyl chloride groups or epoxide groups, which is reacted with hydroxyl groups of glucose which comprises the starch, bonds to starch in a wet or dry process. However, it can not be expected that cationic starch can be prepared by roasting starch under the presence of a cationic polymer having no groups which are highly reactive to hydroxyl group in dry process. Further, it is surprising that the starch is retained in paper layer more effectively by adding as a wet-end additive the starch of the present invention in the state of slurry or spraying it on the wire to improve paper board strength, as compared with the conventional starch commercially available.

The molecular structure of the cationic starch obtained by roasting a starch at a temperature from 60° C. to 200° C. for 10 minutes to 5 hours in dry process under the presence of a cationic polymer is uncertain. However, it is true that only the cationic starch of the present invention provides high retention of starch and that a starch roasted with the cationic polymer at the temperature less than 60° C. does not provide the high retention of starch even if it is added as a slurry of starch granules in water. When an anionic starch, such as phosphorylated starch, is added to a slurry of the starch granules dispersed in water, it is also true that the starch of the present invention is flocculated to form large flock, thereby quickly settling, while the conventional cationic starches or a mixture of starch with cationic polymer are not flocked. It is therefore certain that some interaction between starch and cationic polymer would occur in some degree and the interaction would impart the technical effects mentioned above.

DETAILED EXPLANATION OF THE INVENTION

The method of roasting the starch under the presence of the cationic polymer comprises mixing them both together and then roasting in a conventional roaster to give a final product. Thus the process is simple, effective and economical, because no processes of filtering, washing, draining are necessary.

The starch used in the present invention is not limited, but includes flour and starch obtained from corn, potato, sweet potato, tapioca, wheat, rice and the like; starch processed with etherification, esterification, oxidization, acid-modification, enzyme-conversion; or combinations of two or more thereof.

The cationic groups in the cationic polymer preferably are not limited, but examples thereof are tertiary amine groups or quaternary ammonium salt groups. Examples of the cationic polymers are addition polymers, such as polyaminoalkyl (meth)acrylate, polyvinylpyridinium halide, polydiallylammonium halide; reacted polymers, such as polyaminomethyl acrylamide, polyvinylimidazoline, chitosan; and condensation polymers, such as ionenes, epoxyamines and combinations of two or more thereof, which are not limited thereto. Although the cationic polymers may contain neutral, anionic, or other cationic functional groups therein, the polymers must be cationic as a whole and must show excellent bond to pulp and high retention of starch and increased paper strength. The number average molecular weight of the polymers generally range from several thousands to several millions, concretely 10,000–1,500,000. The polymers generally have an inherent viscosity of 0.5–5.0.

To practice the method of the present invention, the roasting may be preferably performed by using a conventional method such as, dry process, that is, a process which comprises the steps of adjusting water content to less than 30% and then leaving it to stand or mixing at a given temperature for a given time.

The cationic polymer may be present in an amount of 0.1 to 7 parts by weight, based on 100 parts by weight of the starch. If the amount of it is less than 0.1 part by weight, the retention of starch reduces. Further, if it is more than 7 parts by weight, it is uneconomical as the increasing rate of the retention is small.

The treating temperature may be, typically 60 to 200° C., preferably 70° to 150° C. If it is less than 60° C., it is not effective, as an industrial process, because the reaction rate is small. If it is more than 200° C., the solubility of starch increases undesirably by the decomposition, transition and reassociation of the starch molecules to form highly branched low molecular weight dextrin.

Although the treating time depends on the other treating conditions as well as the selection of the treating temperature, it is preferable that the higher the temperature, the shorter the time, and the lower the temperature, the longer the time. It may be 10 minutes to 5 hours, preferably 30 minutes to 3 hours. The rate of reaction is low if the time is shorter, and discoloration and increasing of solubility occurs if it is longer.

In the case of wet-end addition of the starch in the state of slurry, the starch of the present invention provides good retention of more than 90% even under conditions in which conventional corn starch, conventional phosphorylated starch and conventional cationic starch provide the reduced retention less than 50%. The resulting paper board is excellent in compressive strength, tensile strength, bursting strength, excellent water absorption and flexibility. In the case of in the corrugating medium and liner, it is excellent in adhesion property in the process of making a corrugated board, the resulting corrugated board also has high strength.

Although a location where the starch of the present invention is added may be anywhere at which the conventional additives are added, it may be typically added in machine chest, head box and the like.

The starch of the present invention can be optionally used with other starch, additives (such as PAM, etc.), filler (such as clay, calcium carbonate, etc.), sizing agent and the like. Using the starch of the present invention can completely do away with or effectively reduce the addition of PAM to improve the water absorption and flexibility of the paper board.

The starch of the present invention can be used in any of the conventional paper machines for the paper board. Examples of the paper machine include Fourdrinear, tanmo, multicylinder or twin-wire paper machine and the like. The starch of the present invention can provide the most excellent retention even under severe conditions of dehydrating a wet web from both sides of the wet web.

Examples of the paper boards to which the starch of the present invention can be applied are corrugated board base paper (such as corrugating medium, liner), white paper board (such as Manila board, white board), core board, building board, and the like. Particularly, it provides improved bursting strength, compressive strength, water absorption, flexibility of a layer of liner and corrugating medium, and exceedingly improved compressive strength, tensile strength, bursting strength, water absorption and adhesion performance of liner and corrugating medium of multi-layered paper board.

EXAMPLES

The present invention will be further illustrated by reference to the following examples, but are not to be construed to limit the scope thereof.

Starches Preparation

Starch A: Five % aqueous solution of 25g of polydiallyldimethylammonium chloride (inherent viscosity: 1.5) was mixed with 1,000 g of corn starch, and the mixture was roasted at 125° C. for 120 minutes in dry process and moisture was conditioned to 10% to obtain 1,000 g of Starch A.

Starch B: 994 g of Starch B was obtained as generally described in the process of Starch A, with the exception that 20 g of polytrimethylaminoethyl methacrylate (inherent viscosity: 4.0) was used instead of polydiallyldimethylammonium chloride.

Starch C: 978 g of Starch C was obtained as generally described in the process of Starch A, with the exception that 5 g of chitosan (molecular weight of 300,000) was used instead of polydiallyldimethylammonium chloride, and the mixture was roasted at 155° C. for 30 minutes in dry process.

Starch D: Five % aqueous solution of 25g of polydiallyldimethylammonium chloride (inherent viscosity: 1.5) was mixed with 1,000 g of corn starch, and the mixture was roasted at 50° C. for 60 minutes to obtain 1,000 g of Starch D.

Examples 1–3

The resulting Starches A–C described above were added as a wet-end additive in amount of 5% based on a pulp to make paper by experimental square type paper machine, after the slurry of pulp (freeness:Canadian Standard Freeness;550 ml) was prepared so that it has the concentration of pulp of 0.2%, pH of 6.9, basis weight of 200 g/m$^2$. It was dehydrated to 60% of water content by press and then dried at 85° C. for 60 seconds and at 105° C. for 120 seconds. The retention of starch was obtained by a method which the starch was liquified with α-amylase from the resulting paper to measure the content of starch by a phenol-sulfuric acid method, and then calculated the retention of it in the paper layer based on the starch added as a wet-end additive. The results are shown in Table 1 as Examples 1, 2 and 3 including Starches A, B and C respectively. All of them had good values of the retention of more than 90%, and compressive strength factor more than 17.5 kgf.

TABLE 1

| | Starch | | | Retention | C.S.F[1] |
|---|---|---|---|---|---|
| Example | Type | State | Amount (%) | (%) | (kgf) |
| 1 | Starch A | Slurry* | 5 | 95 | 17.8 |
| 2 | Starch B | Slurry* | 10 | 93 | 17.5 |
| 3 | Starch C | Slurry* | 10 | 94 | 17.8 |
| Com.[2] 1 | no | — | — | — | 14.4 |
| Com. 2 | Starch D | Slurry* | 5 | 36 | 15.4 |
| Com. 3 | Corn starch | Slurry* | 5 | 35 | 15.4 |
| Com. 4 | Phos. starch[3] | Slurry* | 5 | 42 | 15.6 |
| Com. 5 | Cat. starch[4] | Slurry* | 5 | 45 | 15.9 |
| Com. 6 | Cat. starch | Gel.[5]* | 5 | 31 | 15.0 |
| Com. 7 | Cat. starch | Gel.* | 0.5 | 92 | 15.3 |

[1]C.S.F. = Compressive strength factor
[2]Com. = Comparative Example
[3]Phos. Starch = Phosphorylated starch
[4]Cat. starch = Cationic starch
[5]Gel. = Gelatinized solution
*Wet-end addition Example 4

The resulting cationic Starch A described above and PAM were added as a wet-end additive in amount of 5% for Starch A based on a pulp and 0.2% for PAM to make paper at pH of 5.8 with a twin-wire paper machine by using the corrugated board waste-paper as the pulp, and resulting in the corrugating medium which had basis weight of 200 g/m². It had the retention of the starch of 96% and the compressive strength factor of 19.4 kgf (shown in Table 2).

Example 5

The corrugating medium which had basis weight of 180 g/m² was obtained as generally described in Example 4 excepting that the resulting cationic Starch B described above was sprayed on the wire of the twin-wire paper machine in amount of 5% based on a pulp and PAM were added as a wet-end additive in amount of 0.2% based on a pulp. It had the retention of the starch of 80% and the compressive strength factor of 18.1 kgf (Table 2).

TABLE 2

| Ex-ample | Starch Type | Starch State | Amount (%) | PAM (%) | Retention (%) | C.S.F[1] (kgf) |
|---|---|---|---|---|---|---|
| 4 | Starch A | Slurry* | 5 | 0.2 | 96 | 19.4 |
| 5 | Starch B | Slurry** | 5 | 0.5 | 80 | 18.1 |
| Com.[2] 8 | no | — | — | — | — | 12.1 |
| Com. 9 | no | — | — | 1.6 | — | 18.2 |
| Com. 10 | Corn starch | Slurry** | 2 | 0.8 | 28 | 13.2 |
| Com. 11 | Cat. starch[3] | Slurry** | 5 | 0.8 | 45 | 14.4 |

[1]C.S.F. = Compressive strength factor
[2]Com. = Comparative Example
[3]Cat. starch = Cationic starch
*Wet-end addition
**Spraying Comparative Examples 1–7

Comparative Examples 1–5 were prepared as generally described in Examples 1–3 excepting that no starch (Comparative Example 1), Starch D (Comparative Example 2), corn starch (Comparative Example 3), phosphorylated starch (Comparative Example 4) and cationic starch (Comparative Example 5) were added in the state of slurry to make paper board. Comparative Examples 6 and 7 were prepared as generally described in Examples 1–3 excepting that the cationic starch was gelatinized and added in the form of a gelatinized solution in different amount, and the results were shown in Table 1. The phosphorylated starch used above had a degree of substitution of 0.03 (3 phosphorylated groups per 100 of glucose unit), and the cationic starch was a type of quaternary ammonium salt and had a degree of substitution of 0.05, both of which obtained from corn starch. All results are not good in retention of starch, excepting that the retention of Comparative Example 7 in which the cationic starch was added in the state of the gelatinizated solution in amount of 0.5% showed good retention.

Comparative Examples 8–11

Comparative Examples 8–11 were prepared as generally described in Example 5 excepting that no starch and no PAM (Comparative Example 8), PAM only (Comparative Example 9), corn starch (Comparative Example 10), and cationic starch (Comparative Example 11) were added in the state of slurry to make paper board at the conditions described in Table 2, and the results were shown in Table 2. All results were not good, except the compressive strength factor of Comparative Example 9 in which PAM was added in an amount of 1.6%.

The starch granules treated with the cationic polymer of the present invention provide higher retention of starch and higher paper board strength than the starch used conventionally, when added as a wet-end additive or sprayed in the process of paper-making.

The starch used in the improvement of the strength of the paper board has been studied for many years. However, the present inventors have discovered for the first time that the improvement of the strength of the paper board was accomplished by adding the starch treated with the cationic polymer in the state of slurry to the layer of paper to retain it in the layer in a high retention rate. The present invention relates to the industrial method of preparing the starch used in improving the strength of the paper board, the starch obtained by the method, and the method of paper-making using the starch.

What is claimed is:

1. A method of preparing a cationic starch which comprises roasting starch at a temperature of from 60° C. to 200° C. for 10 minutes to 5 hours in a dry process in the presence of 0.1 to 7 parts by weight of a cationic polymer per 100 parts by weight of the starch.

2. A cationic starch prepared by the method of claim 1.

3. A method of making paper board which comprises adding the cationic starch of claim 2 to a paper board pulp in the state of a slurry.

4. The method according to claim 1, wherein the temperature for roasting is within the range of from 70° to 150° C.

5. The method of claim 1 wherein the cationic polymer has a number average molecular weight of 10,000 to 1,500,000.

6. A cationic starch prepared by the method of claim 5.

* * * * *